United States Patent [19]
Flatland

[11] 3,932,055
[45] Jan. 13, 1976

[54] VACUUM TURBINE FOR A DRILL

[76] Inventor: Lloyd P. Flatland, 15 Quisisana Drive, Kentfield, Calif. 94904

[22] Filed: Aug. 5, 1974

[21] Appl. No.: 494,543

[52] U.S. Cl................................. 415/131; 415/503
[51] Int. Cl.² ......................................... B23B 47/00
[58] Field of Search ........... 415/210, 131, 503, 112, 415/180

[56] References Cited
UNITED STATES PATENTS

| | | | |
|---|---|---|---|
| 2,030,993 | 2/1936 | Langenkamp et al. | 415/210 |
| 2,977,042 | 3/1961 | Jassniker | 415/112 |
| 3,233,867 | 2/1966 | Ishibashi et al. | 415/131 |
| 3,395,949 | 8/1968 | Kun | 415/112 |
| 3,565,543 | 2/1971 | Mrazek | 415/503 |
| 3,677,660 | 7/1972 | Taniguchi et al. | 415/219 R |
| 3,680,977 | 8/1972 | Rabouyt et al. | 415/210 |

FOREIGN PATENTS OR APPLICATIONS

| | | | |
|---|---|---|---|
| 116,512 | 12/1900 | Germany | 415/210 |
| 462,791 | 7/1928 | Germany | 415/503 |

*Primary Examiner*—Henry F. Raduazo
*Attorney, Agent, or Firm*—Lothrop & West

[57] ABSTRACT

A vacuum turbine for a drill has a housing of tubular configuration about an axis and has a sleeve disposed within the housing and also of tubular configuration about the axis. The sleeve is spaced from the housing to provide an annular air passage between them. A pair of bearings within the sleeve supports a turbine shaft rotatable about the axis. At one end of the shaft is a turbine runner including blades extending across the air passage and also including a shroud at the periphery of the blades and having a rim face normal to the axis and in very close axial relationship to an end face on the housing to reduce the travel of air therebetween.

3 Claims, 1 Drawing Figure

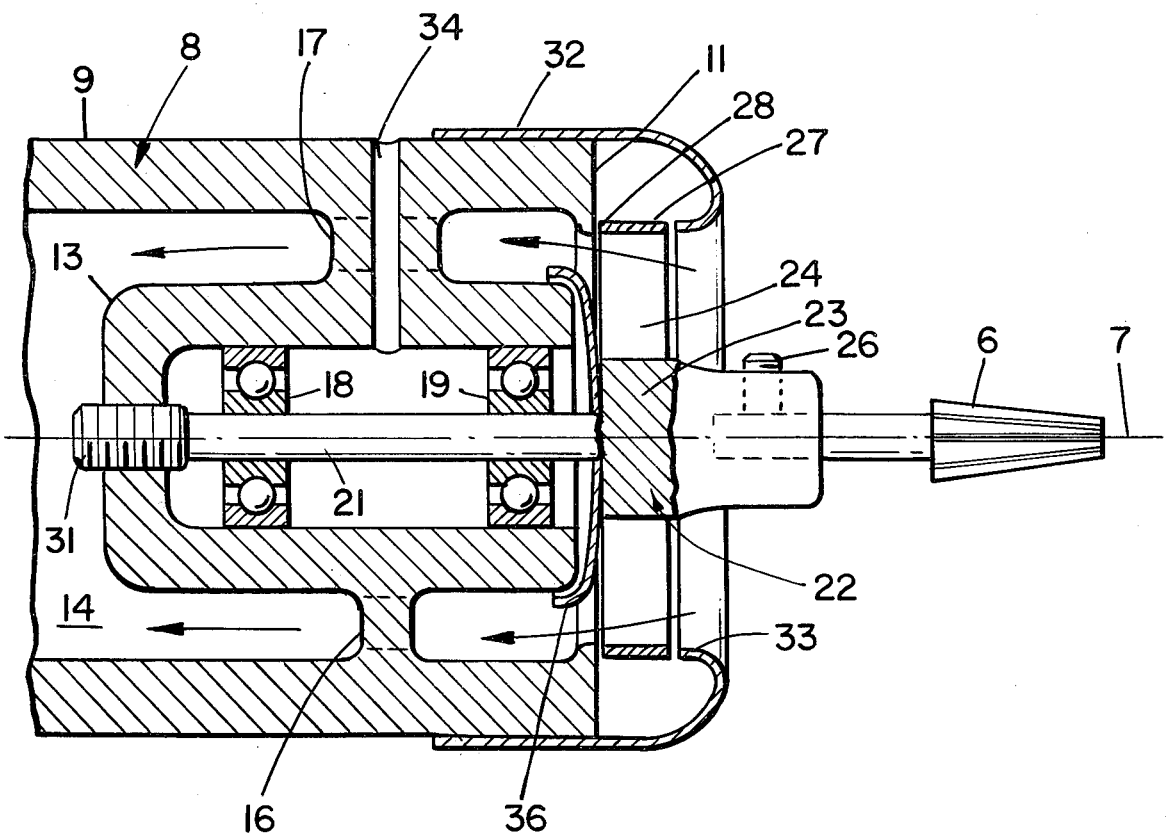

VACUUM TURBINE FOR A DRILL

In the operation of numerous small rotary tools such as dental handpieces, drills and the like, it is often convenient to drive the rotary cutting member by means of a turbine wheel subjected to an air current induced across the wheel by a vacuum, so that the mechanism operates under sub-atmospheric pressure. In relatively small tools it is difficult to provide an efficient turbine since air leakage is relatively large and the efficiency correspondingly is low.

The cost of such tools is usually relatively small so that the provision of precision fits and the like is virturally ruled out.

It is therefore an object of the invention to provide a vacuum operated turbine for small tools such as drills in which the leakage air is reduced substantially by the provision of a relatively cheap, precision air passage.

Another object of the invention is to provide a vacuum turbine of good efficiency operating in small compass.

Another object of the invention is the provision of a vacuum turbine driven rotary tool having a high efficiency and relatively great power.

Another object of the invention is to provide a vacuum turbine construction especially for rotary tools such as drills in which the cost is relatively low.

A further object of the invention is in general to provide an improved air vacuum turbine operated rotary tool.

Other objects, together with the foregoing, are attained in the embodiment of the invention described in the accompanying description and illustrated in the accompanying drawing, in which:

The FIGURE is a somewhat diagrammatic showing in cross-section on an axial plane of a form of vacuum turbine for a drill pursuant to the invention, certain portions being broken away to reduce the figure size and certain parts being omitted for clarity.

A convenient mechanism pursuant to the invention for driving a drill 6 about an axis 7 is provided within a housing 8 symmetrical about the axis 7 and having a generally tubular configuration defined by a housing wall 9 terminating in an end face 11 that is preferably planar and is normal to the axis 7.

Within the housing 8 and conveniently formed integrally therewith is a sleeve 13 also of generally tubular configuration about the axis 7, but spaced from the housing sufficiently to afford an intervening, annular, air passage 14 that is generally uninterrupted except at intervals wherein radial spokes 16 and 17 are provided. The spokes are spaced apart circumferentially so that in most places the air passage 14 is continuous. Within the sleeve 13 there is provided a pair of anti-friction bearings 18 and 19 supporting a turbine shaft 21 for rotation about the axis 7. The shaft at one end carries a turbine runner 22 inclusive of a hub 23 from which extend a plurality of spaced turbine blades 24. The hub 23 is extended and is hollowed to receive the shank of the tool 6 and likewise carries a set screw 26 so that the shank can be gripped or released.

Particularly pursuant to the invention, the turbine blades 24 are not terminated at their radially outermost portions, but rather merge with an integral, circular cylindrical shroud 27 so that radial flow of air from the blades is inhibited. Particularly, the shroud terminates in a rim face 28 that is generally planar and is normal to the axis 7. It is important that the rim face 28 be very closely spaced in an axial direction with respect to the planar end face 11 of the housing. Since the operating thrust on the turbine runner is generally toward the left in the figure, the amount of axial clearance or space between the runner and the housing is regulated or adjusted by a screw 31 at the left end of the sleeve 13, and bearing against the left end of the shaft 21. By a careful and critical adjustment of the screw 31, the space or clearance or gap between the faces 11 and 28 can be made almost vanishingly small, but is sufficient so that the adjacent relatively rotating parts do not actually touch but there can be a small air bearing effect.

The housing 8 is preferably extended by providing a removable cowl 32 that fits tightly over the end of the housing and has a contoured entrance flange 33 for ready ingress of atmospheric air through the turbine blades to the passage 14 itself connected with a source of sub-atmospheric pressure (not shown).

Lubrication of the bearings 18 and 19 is preferably taken care of by the provision of a lubricant passage 34 extending radially through the enlarged spoke 17 to the interior of the sleeve 13, so that lubricant is made available to both the bearings 18 and 19 and likewise can be made available, if desired, to the thrust end of the shaft 21 and the thrust end of the screw 31.

Some leakage of lubricant from the bearings may occur. It is desired to keep such leakage away from the turbine runner. For that reason a slinger 36 is pressed onto the shaft 21 near the turbine blades 24 and overlies the upstream end of the sleeve 13. Any discharging lubricant is directed to join and flow along with the exhausting air and without encountering the runner itself. The configuration, position and spacing of the slinger are such as to assist in the flow of air as it leaves the turbine runner.

With this arrangement, when the device is set into operation with a sub-atmospheric pressure available in the passage 14 at the left end of the figure, incoming atmospheric air is guided by the cowl to flow into the runner mechanism through the blades 24 for the most part, but there is some inevitable leakage between the rim face 28 and the end face 11. Since these are two planar surfaces that can easily and economically be precision machined normal to the axis 7 and since the adjustment screw 31 can make the passage between them extremely small, flow between the surfaces tends to be affected by centrifugal force so that in flow tends to be balanced by out flow and the net flow is minuscule. There is very little air flow through the radial passage so that virtually all of the air must go between the blades. There is consequently provided a close, high precision fit between the runner and the housing but the parts are economical to produce in quantity and do not substantially add to the cost of the structure. The shroud and close fit are effective to prevent short circuiting air flow around the runner.

What is claimed is:

1. A vacuum turbine for a dental drill or the like comprising a housing of tubular configuration about an axis and having an end face normal to said axis, a sleeve within said housing and of tubular configuration about said axis, said sleeve being intergral with said housing and closed at one end and open at the other end and being spaced from said housing to provide an annular air passage therebetween, a pair of bearings within said sleeve and disposed adjacent the respective ends thereof, a turbine shaft mounted in said bearings and rotatable about said axis, said shaft at one end terminating within said sleeve adjacent the closed end thereof, a turbine runner on said shaft adjacent the other end of said sleeve and including blades extending radially across said air passage at the open end of said sleeve, and a circumferential shroud on said runner at the periphery of said blades and having a rim face normal to said axis in close axial spacing from said housing end face.

2. A device as in claim 1 including an axially extending screw in said closed end of said sleeve and abutting said one end of said shaft for shifting said shaft axially to vary the space between said shroud rim face and said end face of said housing.

3. A device as in claim 1 including means on said shaft adjacent said runner and extending across said open end of said sleeve and into said air passage as an oil slinger.

* * * * *